United States Patent
Gupta

(10) Patent No.: US 8,789,174 B1
(45) Date of Patent: Jul. 22, 2014

(54) METHOD AND APPARATUS FOR EXAMINING NETWORK TRAFFIC AND AUTOMATICALLY DETECTING ANOMALOUS ACTIVITY TO SECURE A COMPUTER

(75) Inventor: Prashant Gupta, Cheltenham (GB)

(73) Assignee: Symantec Corporation, Mountain View, CA (US)

( * ) Notice: Subject to any disclaimer, the term of this patent is extended or adjusted under 35 U.S.C. 154(b) by 374 days.

(21) Appl. No.: 12/798,854

(22) Filed: Apr. 13, 2010

(51) Int. Cl.
*G06F 11/30* (2006.01)

(52) U.S. Cl.
USPC .............. 726/22; 726/23; 726/24; 726/25; 709/223; 709/224; 709/225; 713/187; 713/188; 713/189

(58) Field of Classification Search
USPC ............... 726/1, 22–25; 709/223–225; 713/187–189
See application file for complete search history.

(56) References Cited

U.S. PATENT DOCUMENTS

| | | | |
|---|---|---|---|
| 2001/0039579 A1* | 11/2001 | Trcka et al. | 709/224 |
| 2002/0144156 A1* | 10/2002 | Copeland, III | 713/201 |
| 2003/0126449 A1* | 7/2003 | Kelly et al. | 713/187 |
| 2004/0034800 A1* | 2/2004 | Singhal et al. | 713/201 |
| 2006/0095524 A1* | 5/2006 | Kay et al. | 709/206 |
| 2008/0189788 A1* | 8/2008 | Bahl | 726/25 |

FOREIGN PATENT DOCUMENTS

GB 2466120 A * 6/2010 ............ G06F 21/00

OTHER PUBLICATIONS

Stephanie Forrest; Steven A. Hofmeyr; Anil Somayaji; "A Sense of Self for Unix Processes" 1996 IEEE, pp. 120-128.*

* cited by examiner

*Primary Examiner* — Venkat Perungavoor
*Assistant Examiner* — Amir Mehrmanesh
(74) *Attorney, Agent, or Firm* — Wilmer Cutler Pickering Hale and Dorr LLP

(57) ABSTRACT

A method and apparatus for examining network traffic and automatically detecting anomalous activity to secure a computer is described. In one embodiment, the method includes examining network traffic that is directed to at least one endpoint computer, accessing profile information associated with the at least one endpoint computer to determine confidence indicia associated with each portion of the network traffic, comparing the confidence indicia with heuristic information to identify anomalous activity for the at least one endpoint computer and communicating indicia of detection as to the anomalous activity to the at least one endpoint computer.

14 Claims, 8 Drawing Sheets

METHOD AND APPARATUS FOR EXAMINING NETWORK TRAFFIC AND AUTOMATICALLY DETECTING ANOMALOUS ACTIVITY TO SECURE A COMPUTER

BACKGROUND OF THE INVENTION

1. Field of the Invention

Embodiments of the present invention generally relate to a computer security system and, more particularly, to a method and apparatus for examining network traffic and automatically detecting anomalous activity to secure a computer.

2. Description of the Related Art

Widespread Internet usage by small to large organizations results in an increase in computer-related attacks. Various malicious software programs (e.g., viruses, Trojan horses, worms and/or the like) cause many of these related computer attacks. These malicious software programs may be transmitted (i.e. downloaded) to a vulnerable computer without user consent and/or knowledge as executable files, email attachments, multimedia files (e.g., video files, audio files and/or the like), malicious HTML code on web pages and/or the like. Furthermore, the malicious software programs surreptitiously infect vulnerable computers via files employing obfuscation techniques.

The malicious software programs may exert control over an operating system and modify various files (e.g., system registry entries) and/or settings (e.g., background color, screen saver and/or the like) in order to disrupt normal operation. The malicious software programs may also exploit computers for illegitimate purposes. For example, a certain malicious software program may misappropriate sensitive data, such as intellectual property, customer data, medical histories, financial records, purchase orders, legal documents, privileged and/or confidential information, social security numbers, addresses, pictures, documents, contacts and/or the like.

Current detection technologies require an incredible amount of processing power to analyze network traffic for malicious software programs. Computer system specialists must devote a significant amount of time and resources into developing heuristics and software code for discerning the malicious software programs from clean network activity. Unfortunately, malware authors routinely modify the malicious software programs to avoid detection.

Therefore, there is a need in the art for a method and apparatus for examining network traffic and automatically detecting anomalous activity to secure a computer.

SUMMARY OF THE INVENTION

Embodiments of the present invention generally include a method and apparatus for examining network traffic and automatically detecting anomalous activity to secure a computer. In one embodiment, a method for using one or more processors automatically detecting anomalous activity in memory to secure a computer includes examining network traffic that is directed to at least one endpoint computer, accessing profile information associated with the at least one endpoint computer to determine confidence indicia associated with each portion of the network traffic, comparing the confidence indicia with heuristic information to identify anomalous activity for the at least one endpoint computer and communicating indicia of detection as to the anomalous activity to the at least one endpoint computer.

In some embodiments, the network traffic and the heuristic information are transformed into the indicia of detection. In some embodiments, the profile information is generated for each of the at least one endpoint computer. In some embodiments, features are extracted from each file of the network traffic and file groupings are defined based on the extracted features. In some embodiments, the network traffic is classified into the file groupings using the extracted features. In some embodiments, confidence values are assigned to the file groupings.

In some embodiments, a file is received that is communicated to an endpoint computer of the at least one endpoint computer, wherein the file forms a portion of a file grouping, a confidence value is identified for the communicated file and the confidence value is compared with a pre-defined threshold value, wherein the pre-defined threshold value is configured to identify the anomalous activity, wherein the communicated file forms a portion of the anomalous activity if the confidence value falls below the pre-defined threshold value. In some embodiments, the confidence value is adjusted based on the heuristic information. In some embodiments, a security scan is performed on the communicated file. In some embodiments, malware is detected being communicated to the at least one endpoint computer based on the security scan. In some embodiments, the heuristic information is applied to each file being communicated to the at least one endpoint computer.

In another embodiment, an apparatus for using one or more processors automatically detecting anomalous activity in memory to secure a computer includes means for examining network traffic that is directed to at least one endpoint computer, means for accessing profile information associated with the at least one endpoint computer to determine confidence indicia associated with each file being communicated to the at least one endpoint computer, means for applying the heuristic information to the confidence indicia to identify anomalous activity and means for communicating indicia of detection as to the anomalous activity to the at least one endpoint computer.

In some embodiments, the apparatus further includes means for extracting features from the each file of the network traffic and defining file groupings based on the extracted features to generate the profile information. In some embodiments, the apparatus further includes means for classifying the network traffic into the file groupings using the extracted features. In some embodiments, the apparatus further includes means for assigning confidence values to the file groupings.

In yet another embodiments, a computer-readable-storage medium comprising one or more processor-executable instructions that, when executed by at least one processor, causes the at least one processor to examine network traffic that is directed to at least one endpoint computer, access profile information associated with the at least one endpoint computer to determine confidence indicia associated with each portion of the network traffic, compare the confidence indicia with heuristic information to identify anomalous activity for the at least one endpoint computer and communicate indicia of detection as to the anomalous activity to the at least one endpoint computer.

In some embodiments, the one or more processor-executable instructions that, when executed by the at least one processor, causes the at least one processor to receive a file that is communicated to an endpoint computer of the at least one endpoint computer, wherein the file forms a portion of a file grouping, identify a confidence value for the communicated file and compare the confidence value with a pre-defined threshold value, wherein the pre-defined threshold value is configured to identify the anomalous activity, wherein the communicated file forms a portion of the anomalous activity if the confidence value falls below the pre-defined threshold value. In some embodiments, the one or more processor-executable instructions that, when executed by the at least one processor, causes the at least one processor to Instruct security software to perform a security scan on the communicated file. In some embodiments, the one or more processor-executable instructions that, when executed by the at least one processor, causes the at least one processor to detect malware being communicated to the at least one endpoint computer based on the security scan.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Various embodiments of the present disclosure examine network traffic being directed to endpoint computers and automatically identify anomalous activity. By classifying the network traffic into categories or file groupings, network activity profiles may be generated that indicate which file groupings are regularly communicated to the endpoint computers. In some embodiments, a comparison module uses the network activity profiles and heuristic information to identify one or more suspicious files in which each suspicious file has a confidence value that falls below a pre-defined threshold value. Indicia of detection is communicated to the endpoint computers informing any user of the suspicious files as explained further below.

Figure 1:
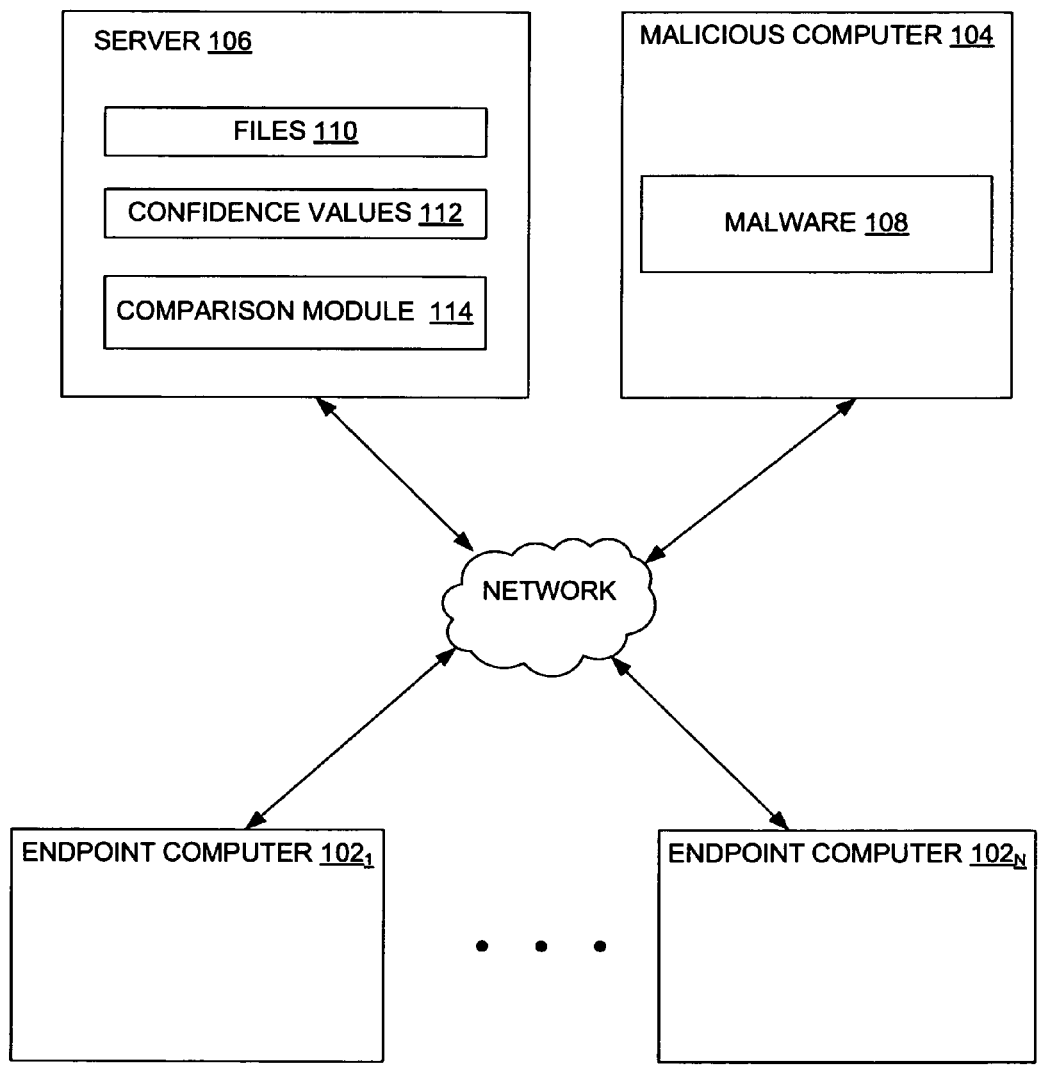
FIG. 1 is a block diagram of a system for examining network traffic and automatically detecting anomalous activity to secure a computer according to one or more embodiments.

FIG. 1 is a block diagram of a system 100 for examining network traffic and automatically detecting anomalous activity to secure a computer according to one or more embodiments of the present invention. The system 100 may includes one or more endpoint computers 102, a malicious computer 104 and a server 106 where each is coupled to each other through a network 108.

Each endpoint computer 102 is a type of computing device (e.g., a laptop, a desktop, a Personal Digital Assistant (PDA) and/or the like) known to one of ordinary skill in the art having the benefit of this disclosure. Generally, the endpoint computer 102 is utilized by a user to access various network resources, such as web pages, various content (e.g., dynamic or static content in the form of images, video and/or audio), online services (e.g., social networking), applications, databases and/or the like. Furthermore, the endpoint computer 102 may be used to communicate data with other computers across the network 108.

The malicious computer 104 is a type of computing device (e.g., a laptop, a desktop, a Personal Digital Assistant (PDA) and/or the like), such as those generally known in the art. The malicious computer 102 includes malware 108 having malicious software code that destroys valuable computer data and/or disrupts computer operations. A hacker may utilize the malicious computer 102 to distribute the malware 108 to several computers, such as the user computer 104. As soon as the endpoint computer 102 executes the malicious software code (e.g., spyware, viruses, rootkits and/or the like), the malware 108 compromises computer security by enabling malware transmission and execution, which causes critical operation disruption and/or sensitive data misappropriation (e.g., passwords, login names, credit card details and/or the like).

The server 106 is a type of computing device (e.g., a laptop, a desktop, a Personal Digital Assistant (PDA) and/or the like) known to one of ordinary skill in the art having the benefit of this disclosure. In some embodiments, the server 106 may be function as a gateway or a filter for network traffic being communicated to the endpoint computers 102. Various software modules running within the server 106 receive a plurality of files 110 and determine confidence values 112 based on various factors as explained in the present disclosure. In some embodiments, a comparison module 114 is executed to evaluate the confidence values 112 and identify suspicious ones of the files 114 as explained further below.

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the Internet using various communications infrastructure such as Ethernet, WiFi, WiMax, General Packet Radio Service (GPRS), and the like.

Figure 2:
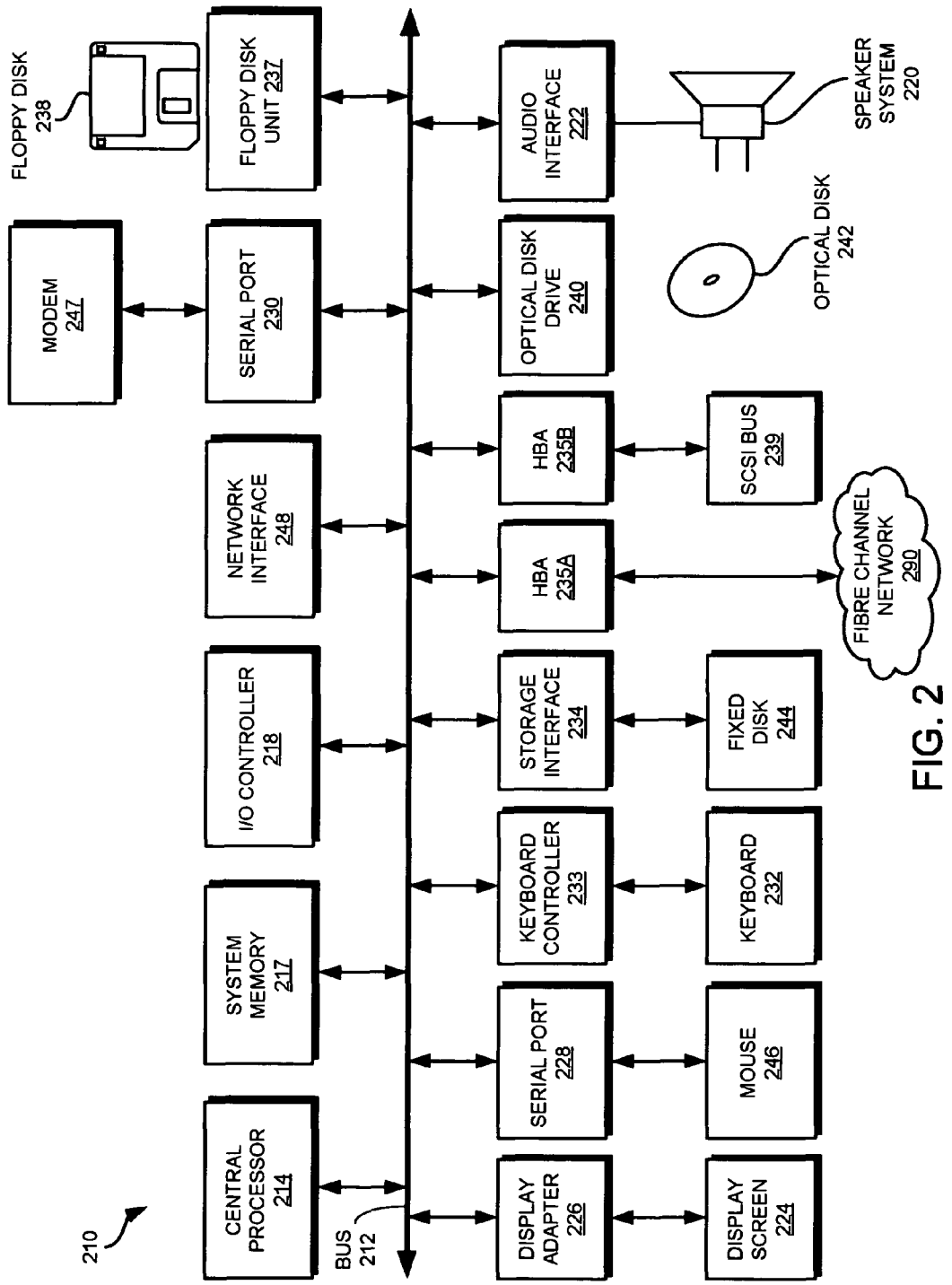
FIG. 2 is a block diagram of a suitable computer for implementing the present disclosure, according to one or more embodiments.

FIG. 2 is a block diagram of a computer system 210 suitable for implementing the present disclosure. This system 210 is representative of a computer system that can be used to implement the server 106 and/or the endpoint computers 102 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral devices. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
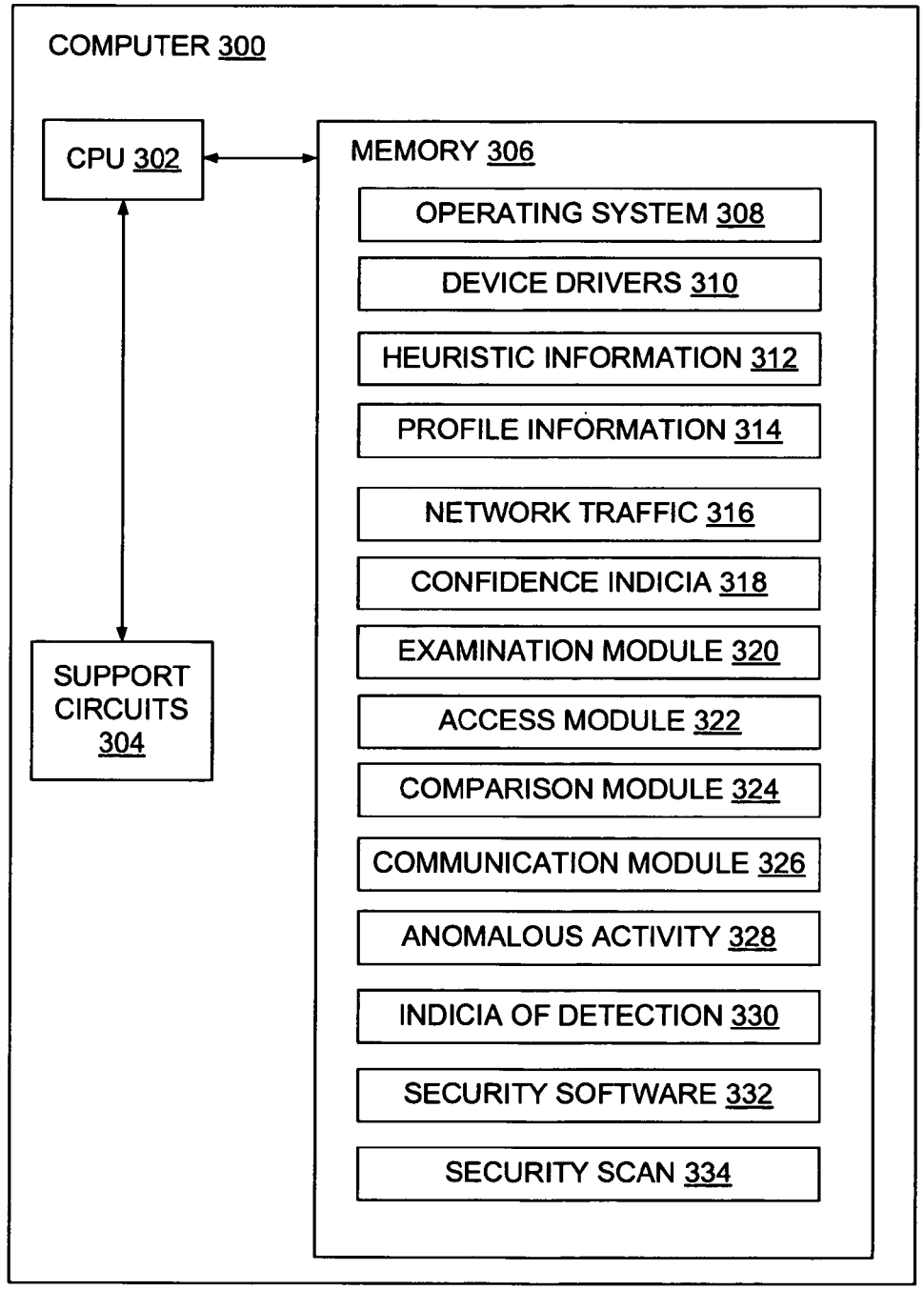
FIG. 3 is a block diagram of a computer for examining network traffic and automatically detecting anomalous activity according to one or more embodiments.

FIG. 3 is a block diagram of a computer 300 for examining network traffic and automatically detecting anomalous activity according to one or more embodiments.

The computer 300 is a type of computing device (e.g., a laptop, a desktop, a Personal Digital Assistant (PDA) and/or the like) that comprises a Central Processing Unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes an operating system 308, device drivers 310 as well as various additional software packages, such as an examination module 320, an access module 322, a comparison module 324, a communication module 326 and security software 332. The memory 306 includes various data, such as heuristic information 312, profile information 314, network traffic 316, confidence indicia 318, anomalous activity 328, indicia of detection 330 and a security scan 334. In some embodiments, the network traffic 330 includes various files (e.g., the files 110 of FIG. 1) that are directed to one or more endpoint computers (e.g., the endpoint computers 102 of FIG. 1).

The operating system 308 generally manages various computer resources (e.g., network resources, data storage resources, file system resources and/or the like). The operating system 308 is configured to execute operations on one or more hardware and/or software devices, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a Network Interface Card (NIC) card to communicate data to another computer as explained further below.

The heuristic information 312 generally refers to techniques for evaluating the confidence indicia 318 associated with files (e.g., the files 110 of FIG. 1) being communicated to one or more endpoint computers. In some embodiments, the heuristic information 312 may include one or more pre-defined threshold values for identifying the anomalous activity 328. Such pre-defined threshold values may ultimately determine whether a particular file is suspicious given a corresponding confidence value. Furthermore, based on various features of the particular file, the heuristic information 312 may be used to adjust the confidence indicia 318 as explained in detail below.

The profile information 314 generally refers to network activity profiles associated with endpoint computers. For a particular endpoint computer, the profile information 314 includes groupings of files having one or more common features, such as file type, compiler type and/or the like. In some embodiments, the profile information 314 may identify these files as packed executables, modified (i.e., cracked) software code, applications with anti-reverse engineering techniques, emails employing obfuscation techniques, documents having embedded scripts that utilize obfuscation techniques, documents having embedded scripts that utilize suspicious techniques and/or the like.

The confidence indicia 318 generally refers to one or more values indicating a likelihood that a particular network activity profile accurately and completely describes each and every grouping of files being communicated to a certain endpoint computer. Such confidence values may be computed based on an age of the particular network activity profile, a volume of the network traffic 316 to the certain endpoint computer, a level of network activity variety, a time since a latest modification and a ratio between known, clean software application to known, malicious software applications that are identified using the profile information 314 according to some embodiments.

In some embodiments, an examination module 320 includes software code (e.g., processor-executable instructions) that is stored in the memory 306 and executed by the CPU 302. The examination module 320 receives the network traffic 316 that is directed to the endpoint computers and classifies each and every portion into a particular category or file grouping. The examination module 320 may classify a plurality of files according to certain features or characteristics. For example, these files may be classified based on file type (i.e., word documents, HTML documents, executables and/or the like).

By classifying the plurality of files into one or more file groupings, the examination module 320 determines which file groupings each endpoint computer regularly receives as well as anomalous file groupings. These file groupings are assembled into network activity profiles for the endpoint computers. For example, a network activity profile may indicate that a particular endpoint computer never receive executable files, but receives several documents daily. Therefore, a legitimate executable file being communicated to the particular endpoint computer is unlikely and hence, suspicious. Then, the examination module 320 assigns a confidence value to each file grouping based on various factors as described in the present disclosure.

In some embodiments, an access module 322 includes software code (e.g., processor-executable instructions) that is stored in the memory 306 and executed by the CPU 302. The access module 322 retrieves the profile information 314 from the memory 306 in order to examine network activity profiles associated with endpoint computers to which the network traffic is directed. These profiles indicate confidence indicia 318 associated with file groupings for the file being communicated to the endpoint computers.

In some embodiments, a comparison module 324 includes software code (e.g., processor-executable instructions) that is stored in the memory 306 and executed by the CPU 302. The comparison module 324 applies the heuristic information 312 to confidence values associated with the files being communicated to the endpoint computers. By comparing these confidence values to pre-determined threshold values, the comparison module 324 identifies anomalous ones of the communicated files.

In some embodiments, a communication module 326 includes software code (e.g., processor-executable instructions) that is stored in the memory 306 and executed by the CPU 302. The communication module 326 produces the indicia of detection 332 with respect to the anomalous activity 328. In some embodiments, the anomalous activity 328 includes information associated with portions of the network traffic 316 that are not regularly communicated to the endpoint computers. For example, the anomalous activity 328 may indicate which files are not likely to be received at the endpoint computers and therefore, suspicious. The communication module 326 may communicate information warning a user of the endpoint computers of the anomalous activity 328.

Alternatively, the communication module 326 may instruct the security software 332 to scan one or more suspicious files of the anomalous activity 328 for malware. The security software 332 records results associated with such scans as the security scan 334. The communication module 326 examines the security scan 334 and either communicates information warning the user of a potential malicious infection if any of the scanned files file is malicious or communicates information warning the user of suspicious files. In some embodiments, the communication module 326 may communicate the scanned files in response a clean security scan 334. In other embodiments, the communication module 326 communicates the scanned files to a backend computer for further analysis.

Figure 4:
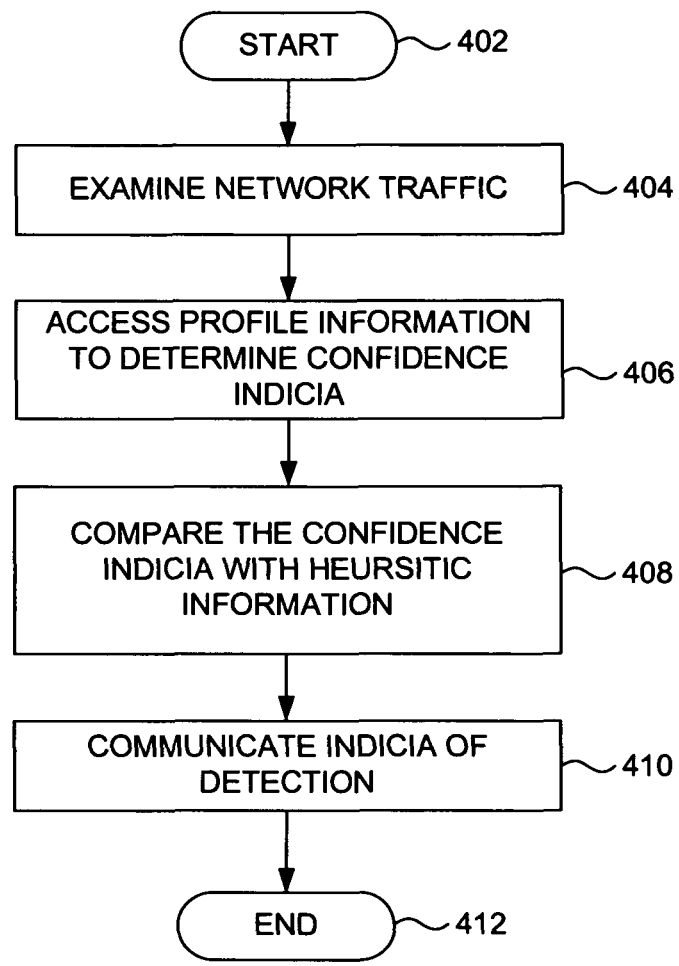
FIG. 4 is a flow diagram of a method for examining network traffic and automatically detecting anomalous activity to secure a computer according to one or more embodiments.

FIG. 4 is a flow diagram of a method 400 for examining network traffic and automatically detecting anomalous activity to secure a computer. In some embodiments, various software modules transform the network traffic and heuristic information into anomalous activity by performing each and every step of the method 400 as explained further below.

The method 400 starts at step 402 and proceeds to step 404. At step 404, the network traffic (e.g., the network traffic 316 of FIG. 3) is examined. In some embodiments, an examination module (e.g., the examination module 320 of FIG. 3) receives, from various sources, a plurality of files that are being communicated to one or more endpoint computers. By examining features associated with the plurality of files, the examination module generates network activity profiles for the one or more endpoint computers. The network activity profiles describe categories or groupings being communicated to the one or more endpoint computers over a given time period. The examination module stores these profiles as profile information (e.g., the profile information 314 of FIG. 3).

At step 406, profile information is accessed to determine confidence indicia (e.g., the confidence indicia 318 of FIG. 3) associated with each portion of the network traffic. In some embodiments, an access module (e.g., the access module 322 of FIG. 3) is configured to access the network activity profiles from the profile information and then, identify confidence values associated with each of the plurality of files.

At step 408, the confidence indicia is compared with heuristic information (e.g., the heuristic information 312 of FIG. 3) to identify anomalous activity (e.g., the anomalous activity 328 of FIG. 3). In some embodiments, a comparison module (e.g., the comparison module 324 of FIG. 3) performs the comparison and determines whether a particular file has one or more features associated with an anomalous file grouping. As an example, if an endpoint computer never receives a legitimate document having an embedded executable file, the comparison module examines each and every file directed to the endpoint computer for these characteristics. Each and every matching file is selected for further analysis. The comparison module stores information associated with the selected files in the anomalous activity.

At step 410, indicia of detection (e.g., the indicia of detection 330 of FIG. 3) as to the anomalous activity is communicated. In some embodiments, a communication module (e.g., the communication module 326 of FIG. 3) produces the indicia of detection in order to inform computer users of suspicious network traffic. At step 412, the method 400 ends.

Figure 5:
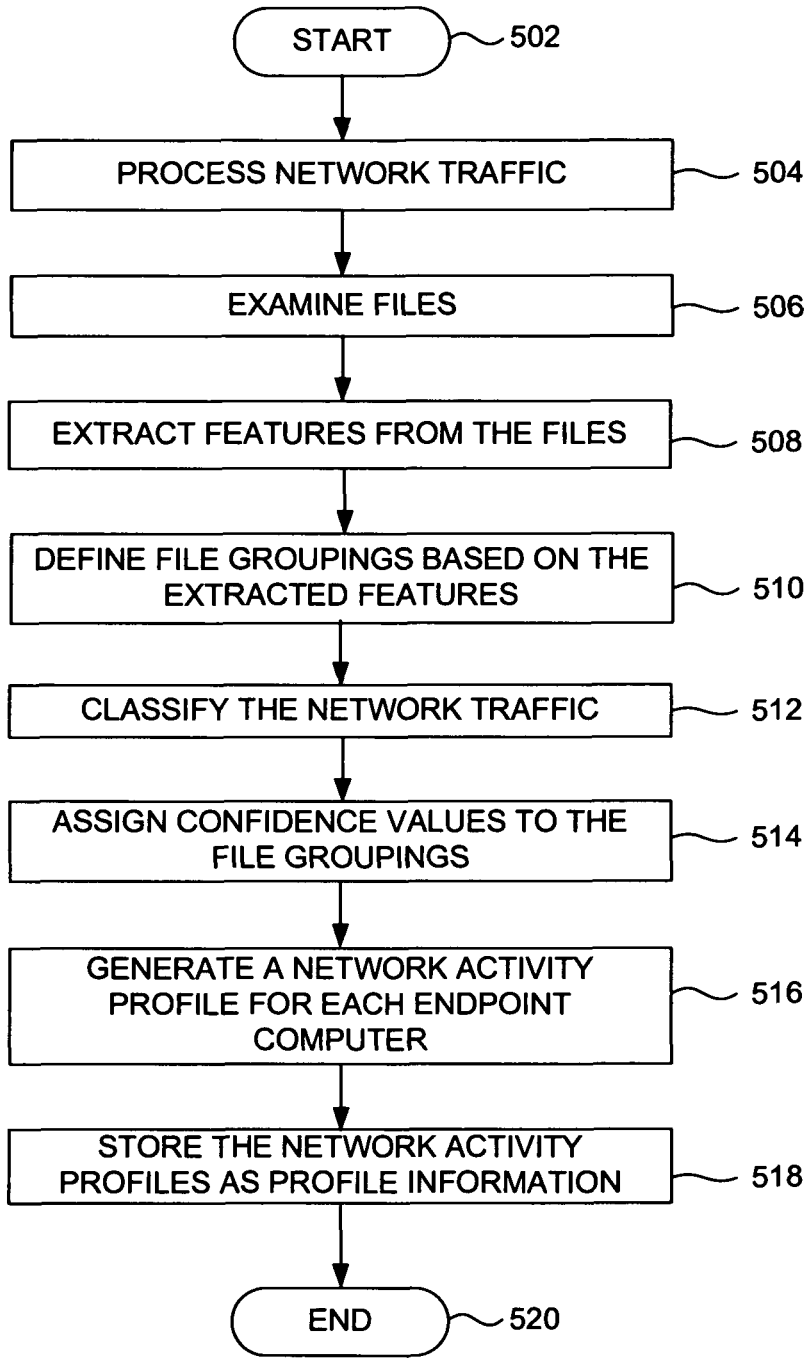
FIG. 5 is a flow diagram of a method for examining network traffic to generate profile information according to one or more embodiments.

FIG. 5 is a flow diagram of a method 500 for examining network traffic to generate profile information according to one or more embodiments. In some embodiments, an examination module (e.g., the examination module 320 of FIG. 3) performs each and every step of the method 500 as explained further below.

The method 500 starts at step 502 and proceeds to step 504. At step 504, network traffic (e.g., the network traffic 316 of FIG. 3) is processed. At step 506, files are examined. While executed within a server (e.g., the computer 300 of FIG. 3), the examination module receives the network traffic directed to one or more endpoint computers.

At step 508, one or more features are extracted from the files. At step 512, the network traffic is classified according to the created file groupings. At step 510, file groupings are defined based on the extracted features. In some embodiments, the examination module evaluates metadata and/or other various attributes for the purpose of grouping the files by one or more similar features. The examination module may classify the network traffic by file type, compiler type, embedded data (i.e., scripts), obfuscation technique and/or the like. The examination module may organize the files according to features commonly associated with safe network traffic. In addition, the examination module may also determine file groupings indicating infection by malware, such as documents having an embedded executable.

At step 514, confidence values are assigned to the created file groupings. In some embodiments, the examination module computes a specific confidence value for each file grouping being communicated to each endpoint computer. Because the endpoint computers receive different network activity, the confidence values also differ for a same file grouping on separate computers. For example, a particular endpoint computer may never receive a packed executable while another computer routinely receives such files. Because of the propensity for distributing malware, the examination module assigns a low confidence value to a packed executable file grouping that is specific to the particular endpoint computer. Packed executables, however, are associated with safe network activity with respect to the other endpoint computer. Since the other endpoint computer is a regular recipient of packed executables, the examination module assigns a higher confidence value to the packed executable file grouping.

At step 516, generate a network activity profile for each endpoint computer. In some embodiments, the examination module assembles the file groupings and the confidence values into the network activity profiles. At step 518, the profiles are stored as profile information (e.g., the profile information 314 of FIG. 3). At step 520, the method 500 ends.

Figure 6:
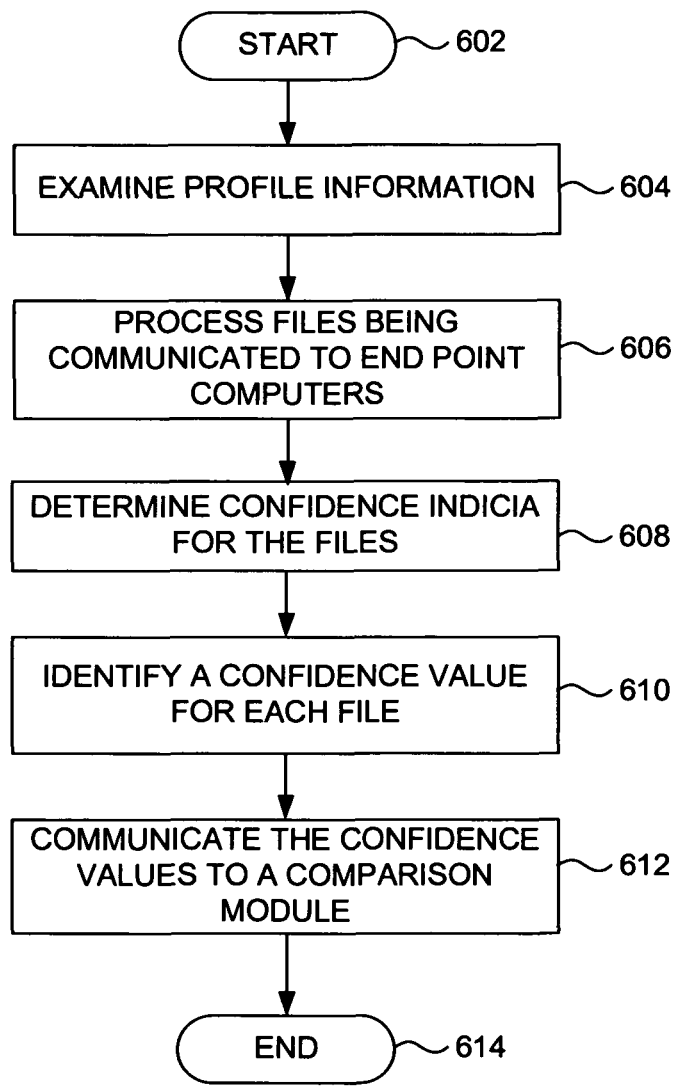
FIG. 6 is a flow diagram of a method for accessing profile information to determine confidence indicia according to one or more embodiments.

FIG. 6 is a flow diagram of a method 600 for accessing profile information to determine confidence indicia according to one or more embodiments. In some embodiments, an access module (e.g., the access module 322 of FIG. 3) performs each and every step of the method 600 as explained further below.

The method 600 starts at step 602 and proceeds to step 604. At step 604, profile information (e.g., the profile information 314 of FIG. 3) is examined. In some embodiments, the access module is configured to access network activity profiles from the profile information that is stored in memory (e.g., the memory 306 of FIG. 3). At step 606, files being communicated to one or more endpoint computers are processed. In some embodiments, the access module retrieves information associated with these files from network traffic (e.g., the network traffic 316 of FIG. 3), such as file names.

At step 608, confidence indicia (e.g., the confidence indicia 318 of FIG. 3) for the files are accessed. The access module uses the file names to determine the confidence indicia associated with the files being communicated to the endpoint computers. In some embodiments, the confidence indicia includes one or more confidence values that are computed on the basis of various factors as described in the present disclosure. At step 610, a confidence value is identified for each file. At step 612, the confidence values are communicated to a comparison module. At step 614, the method 600 ends.

Figure 7:
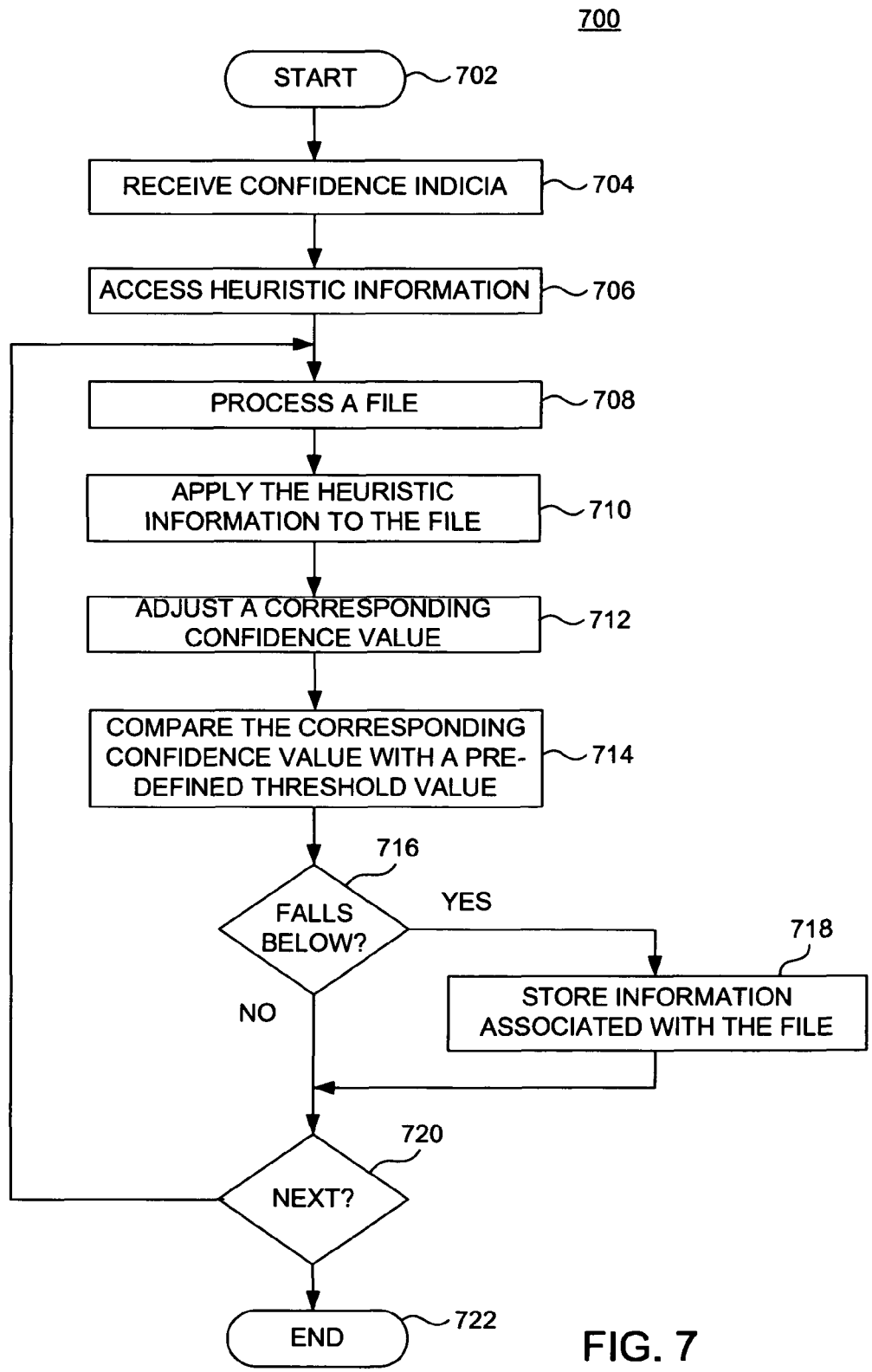
FIG. 7 is a flow diagram of a method for comparing confidence indicia with heuristic information to identify anomalous activity according to one or more embodiments.

FIG. 7 is a flow diagram of a method 700 for comparing confidence indicia with heuristic information to identify anomalous activity according to one or more embodiments. In some embodiments, a comparison module (e.g., the comparison module 324 of FIG. 3) performs each and every step of the method 700 as explained further below.

The method 700 starts at step 702 and proceeds to step 704. At step 704, the confidence indicia (e.g., the confidence indicia 318 of FIG. 3) is received. In some embodiments, the comparison module receives the confidence indicia from an access module (e.g., the access module 324 of FIG. 3) and extracts confidence values associated with a plurality of files being communicated to one or more endpoint computers. At step 706, the heuristic information (e.g., the heuristic information 312 of FIG. 3) is accessed. The comparison module accesses the heuristic information from memory (e.g., the memory 306 of FIG. 3).

At step 708, a file is processed. In some embodiments, the comparison module accesses the file that constitutes a portion of network traffic (e.g., the network traffic 316 of FIG. 3) directed to a particular endpoint computer. At step 710, the heuristic information is applied to the file. As described in the present disclosure, the heuristic information defines techniques for evaluating the confidence values. At step 712, a corresponding confidence value is adjusted. In some embodiments, the presence of the file may cause the comparison module to modify the corresponding confidence value. For example, if the file is an executable that includes known malware, then the comparison module lowers the corresponding confidence value to prevent a potential infection at a particular endpoint computer. As another example, the comparison module may raise the corresponding confidence value if the file is associated with known, safe network traffic.

In some embodiments, the heuristic information includes one or more pre-defined threshold values for identifying files that constitute anomalous activity (e.g., the anomalous activity 328 of FIG. 3). Such files may be suspicious due to low confidence values indicating a strong likelihood of the presence of various threats, such as malware. At step 714, the corresponding confidence value is compared with a pre-defined threshold value. At step 716, a determination is made as to whether the corresponding confidence value falls below the pre-defined threshold value. If the corresponding confidence value exceeds the pre-defined threshold value, the method 700 proceeds to step 720.

If, on the other hand, the corresponding confidence value falls below the pre-defined threshold value, the method 700 proceeds to step 718. At step 718, information associated with the file is stored in the anomalous activity. At step 720, a determination is made as to whether there is a next file to be processed for anomalous activity. If there is a next file, the method returns to step 710. If, on the other hand, there are, no more files within the network traffic, the method 700 proceeds to step 722. At step 722, the method 700 ends.

Figure 8:
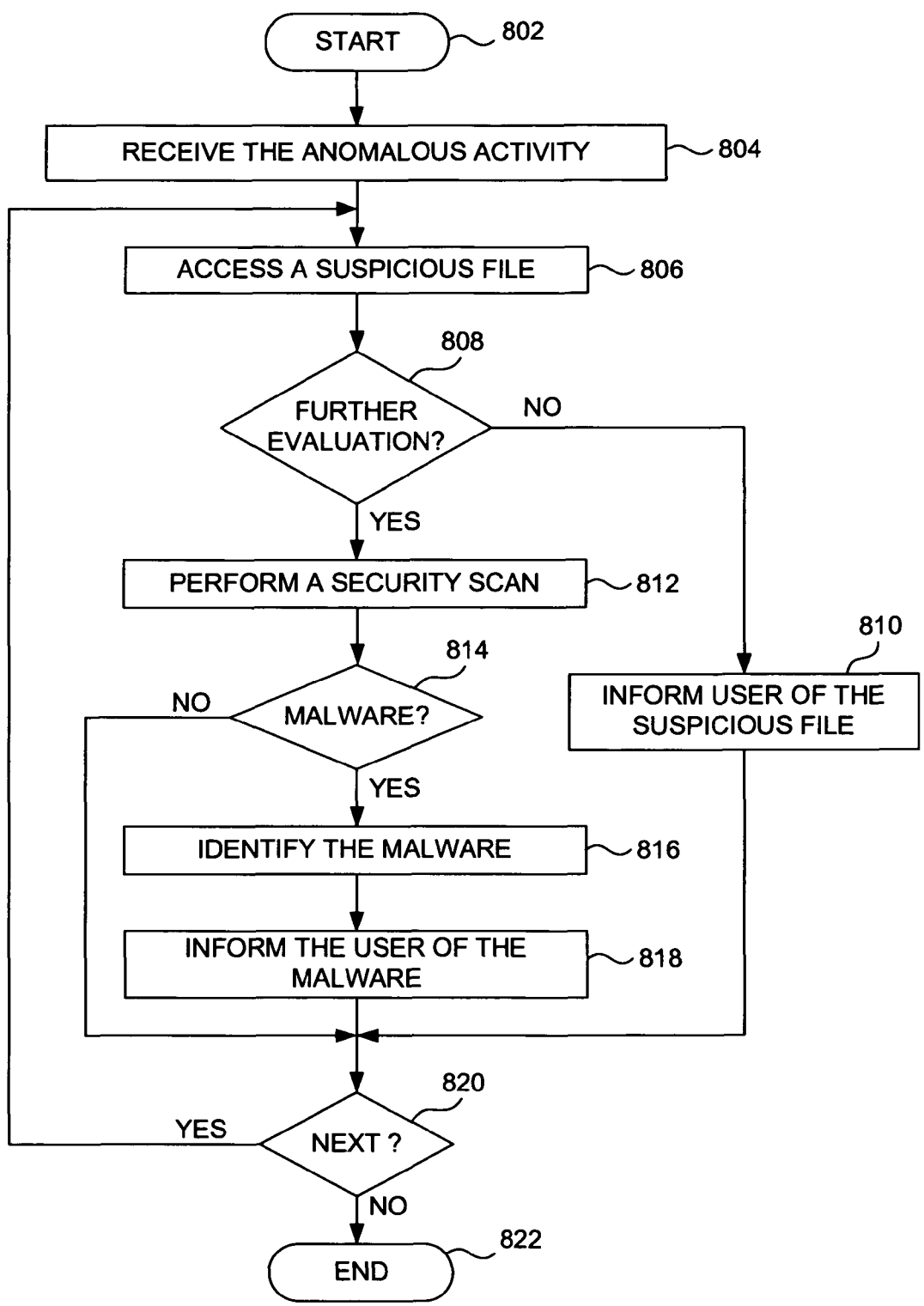
FIG. 8 is a flow diagram of a method for communicating indicia of detection as to anomalous activity to one or more endpoint computers according to one or more embodiments.

FIG. 8 is a flow diagram of a method 800 for communicating indicia of detection as to anomalous activity to the at least one endpoint computer according to one or more embodiments. In some embodiments, a communication module (e.g., the communication module 326 of FIG. 3) performs each and every step of the method 800 as explained further below.

The method 800 starts at step 802 and proceeds to step 804. At step 804, the anomalous activity (e.g., the anomalous activity 328 of FIG. 3) is received. At step 806, a suspicious file is accessed. In some embodiments, the communication module processes the anomalous activity and extracts information associated with the suspicious file. At step 808, a determination is made as to whether the suspicious file is to be further evaluated. If the suspicious file is not to be further evaluated, the method 800 proceeds to step 810. At step 810, a user is informed of the suspicious file. After step 810, the method 800 proceeds to step 820. If, on the other hand, the suspicious file is to be further evaluated, the method 800 proceeds to step 812.

In some embodiments, the communication module determines that the suspicious file most likely includes a threat, such as malware. For example, a corresponding confidence value may be very low. Various additional features may also indicate a potential infection caused by the suspicious file, such as obfuscation techniques. Before communication to a target endpoint computer, the communication module instructs security software to perform the security scan on the suspicious file. At step 812, a security scan is performed. In some embodiments, the security software examines the suspicious file for malicious software code. At step 814, a determination is made as to whether the suspicious file is malware. If the suspicious file is determined to be malware, then the method 800 proceeds to step 816. At step 816, the malware is identified. At step 818, the user is informed of the malware.

In some embodiments, the security software detects the malicious software within the suspicious file and returns information identifying the malware to the communication module. The communication module subsequently produces the indicia of detection, which informs the computer user of the malware. If, on the other hand, the malware is not detected, then the method 800 proceeds to step 820. Optionally, the communication module transmits the suspicious file to the target endpoint computer due to a clean security scan. At step 820, a determination is made as to whether there is a next suspicious file within the anomalous activity. If there is another suspicious file, the method 800 returns to step 806. If, on the other hand, there are no more suspicious files, the method 800 proceeds to step 822. At step 822, the method 800 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for using one or more processors automatically detecting anomalous activity in memory to secure a computer, comprising:

examining at least one data segment of network traffic that is directed to at least one endpoint computer wherein examining network traffic comprises generating profile information for each of the at least one endpoint computer and wherein generating profile information comprises:
extracting features from the at least one data segment of network traffic;
defining file groupings based on the extracted features;
classifying the at least one data segment of network traffic into the file groupings using the extracted features; and
assigning confidence values to the file groupings;
accessing the profile information associated with the at least one endpoint computer, wherein the profile information indicates characteristics of non-anomalous network traffic;
computing confidence indicia for the at least one data segment of network traffic, wherein the confidence indicia are computed based on the accessed profile information and at least a portion of the at least one data segment of network traffic;
comparing the confidence indicia with heuristic information to identify anomalous network activity for the at least one endpoint computer; and
communicating indicia of detection as to the anomalous activity to the at least one endpoint computer.

2. The method of claim 1, further comprising transforming the at least one data segment of network traffic and the heuristic information into the indicia of detection.

3. The method of claim 1, wherein the characteristics of non-anomalous network traffic comprise characteristics of anomalous network traffic.

4. The method of claim 1, wherein comparing the confidence indicia with the heuristic information further comprises:
receiving a file that is communicated to an endpoint computer of the at least one endpoint computer, wherein the file forms a portion of a file grouping;
identifying a confidence value for the communicated file; and
comparing the confidence value with a pre-defined threshold value, wherein the pre-defined threshold value is configured to identify the anomalous network activity, wherein the communicated file forms a portion of the anomalous network activity if the confidence value falls below the pre-defined threshold value.

5. The method of claim 4, wherein identifying the confidence value further comprises adjusting the confidence value based on the heuristic information.

6. The method of claim 4, further comprising performing a security scan on the communicated file.

7. The method of claim 6, further comprising communicating scanned files to a backend computer for further analysis based on the security scan.

8. The method of claim 1, wherein comparing the heuristic information with the confidence indicia further comprises applying the heuristic information to each file being communicated to the at least one endpoint computer.

9. A system for automatically detecting anomalous activity in memory to secure a computer, comprising:
one or more processors communicatively coupled to a network; wherein the one or more processors are configured to:
examine at least one data segment of network traffic that is directed to at least one endpoint computer;

extract features from the at least one data segment of network traffic;

define file groupings based on the extracted features;

classify the at least one data segment of network traffic into the file groupings using the extracted features; and assign confidence values to the file groupings;

generate profile information, wherein the profile information is generated from the file groupings;

access profile information associated with the at least one endpoint computer, wherein the profile information indicates characteristics of non-anomalous network traffic;

compute confidence indicia for the at least one data segment of network traffic, wherein the confidence indicia are computed based on the accessed profile information and at least a portion of the at least one data segment of network traffic;

apply the heuristic information to the confidence indicia to identify anomalous network activity; and communicate indicia of detection as to the anomalous network activity to the at least one endpoint computer.

10. The system of claim 9, wherein the one or more processors are further configured to:

receive a file that is communicated to an endpoint computer of the at least one endpoint computer, wherein the file forms a portion of a file grouping; identify a confidence value for the communicated file; and compare the confidence value with a pre-defined threshold value, wherein the pre-defined threshold value is configured to identify the anomalous network activity, wherein the communicated file forms a portion of the anomalous network activity if the confidence value falls below the pre-defined threshold value.

11. A non-transitory computer-readable-storage medium comprising one or more processor-executable instructions that, when executed by at least one processor, cause the at least one processor to:

examine at least one data segment of network traffic that is directed to at least one endpoint computer;

extract features from the at least one data segment of network traffic;

define file groupings based on the extracted features;

classify the at least one data segment of network traffic into the file groupings using the extracted features; and assign confidence values to the file groupings;

generate profile information, wherein the profile information is generated from the file groupings;

access profile information associated with the at least one endpoint computer, wherein the profile information indicates characteristics of non-anomalous network traffic;

compute confidence indicia for the at least one data segment of network traffic, wherein the confidence indicia are computed based on the accessed profile information and at least a portion of the at least one data segment of network traffic;

compare the confidence indicia with heuristic information to identify anomalous network activity for the at least one endpoint computer; and communicate indicia of detection as to the anomalous network activity to the at least one endpoint computer.

12. The non-transitory computer-readable-storage medium of claim 11, further comprising one or more processor-executable instructions that, when executed by the at least one processor, cause the at least one processor to:

receive a file that is communicated to an endpoint computer of the at least one endpoint computer, wherein the file forms a portion of a file grouping;

identify a confidence value for the communicated file; and compare the confidence value with a pre-defined threshold value, wherein the pre-defined threshold value is configured to identify the anomalous network activity, wherein the communicated file forms a portion of the anomalous network activity if the confidence value falls below the pre-defined threshold value.

13. The non-transitory computer-readable-storage medium of claim 12, further comprising one or more processor-executable instructions that, when executed by the at least one processor, cause the at least one processor to:

instruct security software to perform a security scan on the communicated file.

14. The non-transitory computer-readable-storage medium of claim 13, further comprising one or more processor-executable instructions that, when executed by the at least one processor, cause the at least one processor to:

communicate scanned files to a backend computer for further analysis based on the security scan.

* * * * *